UNITED STATES PATENT OFFICE.

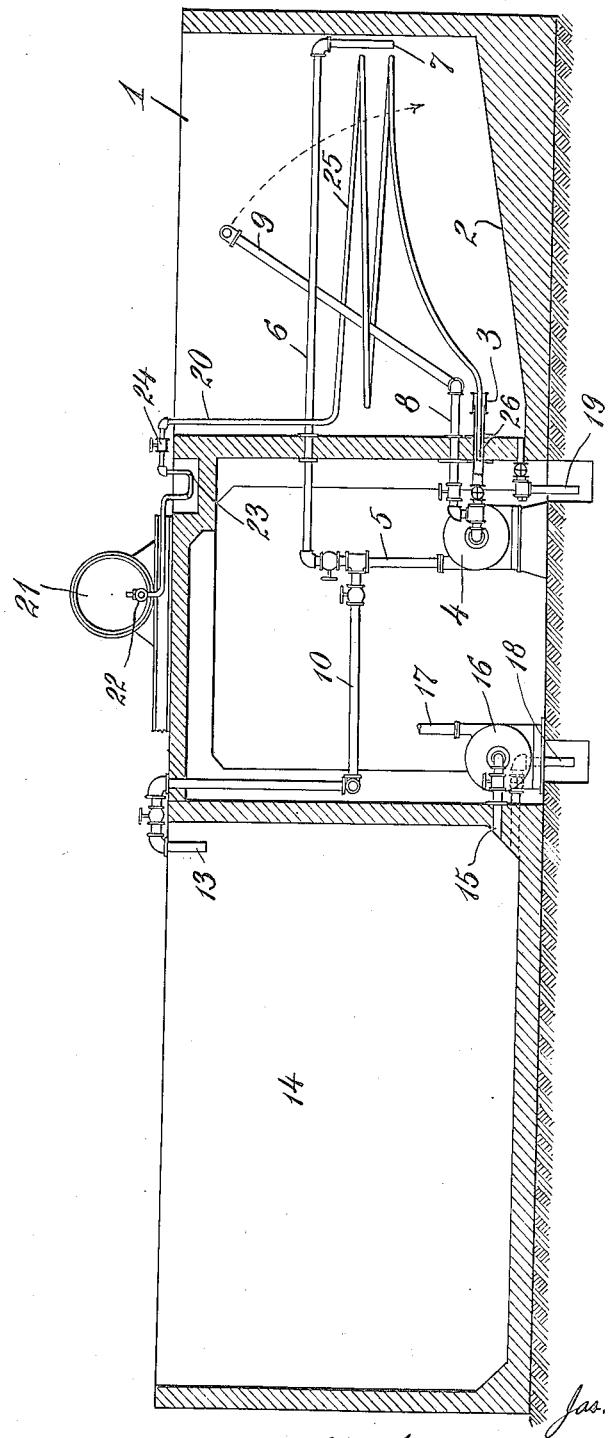

JAMES H. MacMAHON, OF NIAGARA FALLS, NEW YORK, ASSIGNOR TO THE MATHIESON ALKALI WORKS, INC., OF NEW YORK, N. Y., A CORPORATION OF VIRGINIA.

PREPARATION OF LIQUID BLEACH SOLUTIONS.

1,426,752.

Specification of Letters Patent. Patented Aug. 22, 1922.

Application filed March 4, 1922. Serial No. 541,224.

*To all whom it may concern:*

Be it known that I, JAMES H. MacMAHON, a citizen of the United States, residing at Niagara Falls, in the county of Niagara, State of New York, have invented certain new and useful Improvements in the Preparation of Liquid Bleach Solutions; and I do hereby declare the following to be a full, clear, and exact description of the invention, such as will enable others skilled in the art to which it appertains to make and use the same.

This invention relates to improvements in the preperation of liquid bleach solutions.

The manufacture of liquid bleach solutions by passing chlorine gas into milk-of-lime, caustic soda solutions or similar alkalies has long been known. It is customary, for example, in preparing these solutions on a small scale to simply pass the gas into the alkali solution in approximately chemically equivalent proportions. In making such solutions, however, the temperature should not rise above approximately 40° C., since such solutions are unstable and their rate of decomposition increases very rapidly above 40° C. For this reason it is customary to make only dilute solutions, starting with a cold alkaline solution, or when more concentrated solutions are made, refrigeration of the solution during the reaction is necessary to keep the temperature below the critical point. This cooling or refrigeration of the solution has been accomplished, for example, by adding ice, or by cooling by means of cold brine coils, or by similar methods.

According to the present invention, bleach solutions of relatively high concentration can be directly produced in a particularly advantageous way without danger of objectionable overheating of the solution.

In the carrying out of the invention, liquid chlorine is employed and it is brought, while still in a liquid state, directly into, or into heat interchanging relation with, the alkaline solution with which it is to be combined in forming the bleach solutions; and advantage is thus taken of the large amount of latent heat of vaporization of the liquid chlorine to cool the alkaline solution being reacted upon; thus avoiding the necessity for the employment of refrigeration by brine coils or similar expedients, and also avoiding the necessity for special provisions for heating and vaporizing the liquid chlorine before it is brought into contact, directly or indirectly, with the alkaline solution.

Various methods of procedure can be followed in carrying out the process of the invention. The liquid chlorine can be obtained from the usual containers therefore, but these containers should be so arranged or connected that the chlorine will be drawn off therefrom in a liquid state, instead of in a gaseous state, thus avoiding the vaporization of the chlorine in the containers and the lowering of temperature incident thereto. By avoiding this lowering of temperature in the chlorine container, there is likewise avoided the necessity for heating the container to neutralize the cooling effect due to vaporization. Where the chlorine is supplied in large containers, for example, containers holding one ton or more of liquid chlorine, the utilization of the liquid chlorine directly, according to the present invention, eliminates the necessity for the provision of an intermediate heating and vaporizing container, intermediate the large chlorine container and the alkaline solution, for heating the liquid chlorine and neutralizing its heat of vaporization. The present process, accordingly, involves a marked simplification in the manner of handling liquid chlorine heretofore employed, and in the expedients for handling it heretofore resorted to.

The conducting of the liquid chlorine into, or into heat interchanging relation with, the alkaline solution, can be carried out in various ways. One advantageous method of doing this is to introduce the liquid chlorine through a metal pipe coil, preferably of lead, placed in the bottom of the tank containing the alkaline solution, one end of this coil being connected to the liquid chlorine supply, and the other end being provided with a nozzle for breaking up the stream of chlorine gas or through an injector nozzle to circulate the liquid. Instead of introducing the chlorine gas through a nozzle, it may be introduced through a number of small perforations arranged at intervals along the length of the pipe coil, in which case the coil may be closed at its end. The pipe coil should be long enough to provide the necessary heat interchange, so that the liquid chlorine therein will be vaporized by the heat of the surrounding solution. The solution will itself be cooled by the low temperature at which the vaporization of the liquid chlorine takes place, so that the heat of the original solution, together with the heat of reaction, will supply the heat necessary for vaporization of the liquid chlorine, and so that the vaporization of the liquid chlorine will in turn counteract the heat of reaction and prevent the temperature from rising to an objectionable degree. When the chlorine is introduced through such a pipe coil, the liquid chlorine should not ordinarily be permitted to escape into the solution in a liquid form, since the vaporization of the liquid, when so introduced, would cause the formation of relatively large bubbles of chlorine which would not be readily absorbed, while the introduction of the chlorine in this way would tend to cause local supersaturation of the solution and objectionable local overheating. Where, however, the chlorine is first vaporized and then introduced in gaseous form, and particularly where the solution is rapidly agitated, e. g., by introducing the chlorine through an injector nozzle, or where the solution is of sufficient depth to permit substantially complete absorption of the chlorine gas introduced therein, the solution can be readily chlorinated and relatively strong bleach solutions produced without objectionable overheating of the solution.

Another method of introducing the liquid chlorine into the bleach solution is to atomize the liquid chlorine in very fine streams directly into the solution, the streams being sufficiently fine to avoid the formation of gas bubbles of excessive size, due to vaporization of the liquid chlorine or the alkaline solution being vigorously agitated to bring about rapid dissemination of the chlorine, when so introduced.

Another method of introducing the liquid chlorine is to atomize it into an apparatus in which the alkaline solution is sprayed or showered through a chamber or tower, so that the liquid chlorine will be vaporized and will form a chlorine atmosphere through which the alkaline solution is showered at a temperature maintained sufficiently low by the vaporization of the liquid chlorine. The alkaline solution can be recirculated, if necessary, to further increase its strength, or the alkaline solution can be passed down through a tower containing obstructions to retard its flow and to expose a maximum amount of surface of the alkaline solution to the gas. Instead of introducing the liquid chlorine directly into the tower or apparatus into which the alkaline solution is introduced, the chlorine may first be passed through a pipe coil submerged in the alkaline solution to accomplish the vaporization or partial vaporization of the liquid chlorine and the simultaneous cooling of the solution, and the solution and chlorine gas may thereafter be brought into contact with each other, for example, in much the same way now employed in introducing chlorine gas into the alkaline solutions. The solution into which the chlorine is introduced may be the same body of solution utilized for heating the liquid chlorine and bringing about its vaporization, or the body of alkaline solution can be circulated and brought into contact at one location with the chlorine gas and at another location brought into heat interchanging relation with the liquid chlorine.

An improved apparatus embodying the invention and adapted for the practise of the process of the invention is illustrated in a somewhat conventional and diagrammatic manner in the accompanying drawing in vertical section and with parts in elevation.

In the apparatus illustrated, the mixing tank 1 has an inclined bottom and an outlet pipe 3 leading to the suction side of a pump 4, which discharges through the pipes 5 and 6, back to the mixing tank through the outlet pipe 7. A separate outlet pipe 8 is provided, also connected to the suction side of the pump, and having a pipe section 9 pivoted thereto in such a way that the upper end of the pipe 9 can be raised or lowered to permit drawing off of the clear settled chlorinated liquor from different levels. The discharge side of the pump is also connected through the pipes 5, 10 and 13 to the stock tank 14 from which the solution can be withdrawn through the pipe 15 and pumped by the pump 16 through the pipe 17, to the place of use of the solution. A clean-out drain 18 is provided for the stock tank 14 and a similar drain pipe 19 is provided at the bottom of the mixing tank 1.

The liquid chlorine is supplied from the container 21 which may be a drum of, for example, 1 ton capacity and is drawn off through the valve 22 at the bottom of the container so that vaporization of the chlorine and drawing off of gaseous chlorine from the top of the container is avoided. The liquid chlorine passes through the pipes 23, past the expansion valve 24 and then through the chlorine pipe 20 and the coil 25. The liquid chlorine passing through the coil is heated by the surrounding liquid in the manner above described, and is itself vaporized while at the same time serving to cool the surrounding solution. The vaporized chlorine escapes from the coil 25 through the outlet nozzle 26 which extends well into the pipe 3 connected to the suction side of the pump so that the chlorine will be drawn in with the solution and intimately mixed therewith while passing through the pump and through the discharge conduits 5, 6 and 7. The pipes 3, 5, 6, 8 and 10 have suitable valves therein for regulating the flow of liquid therethrough.

In the operation of the apparatus illustrated, the alkaline solution, for example, milk-of-lime is introduced into the mixing tank 1 which may be, e. g., about 20-ft. deep and which may have a capacity of say 12,000 gallons. The liquid chlorine from the 1 ton container 21 is introduced in regulated amount through the expansion valve 24 to the coil 25 which may have a length for example of about 60-ft. such that the liquid chlorine will be vaporized therein. The valves in the pipes 8 and 10 will be closed and those in the pipes 3 and 6 open, and the pump 4 will be set in operation. The alkaline solution will be drawn from the mixing tank through the suction pipe 3 and the chlorine gas will similarly be drawn into the pump from the nozzle 26 and the chlorine and alkaline solution will be intimately mixed in the pump and in the pipes 5, 6 and 7, and the mixture will then be discharged through the pipe 7 into the mixing tank. This circulation will be continued until the alkaline solution has been chlorinated to the desired degree. The heat of reaction will be counteracted by the heat of vaporization of the chlorine, thus maintaining the temperature of the solution below that which will cause objectionable decomposition.

When using milk-of-lime as the alkaline solution, the solution will be drawn off near the bottom where the undissolved lime will tend to accumulate so that the solution circulated through the pump, and with which the chlorine is brought into intimate contact, will tend to contain an excess of the lime with which the chlorine can react, thus facilitating the operation.

When the solution has been chlorinated to the desired degree, the circulation of the pump is stopped and the chlorine supply is also cut off and the solution is permitted to settle to free it from undissolved lime or other impurities which can be drawn off through the clean-off pipe 19. The clear settled chlorinated liquor can be drawn off through the pipe 9, the upper end of which can be lowered for this purpose. In this case, the valves in the pipes 3 and 6 will be closed and those in the pipes 8 and 10 open, and the clear solution will then be pumped into the stock tank or storage tank 14 from which it can be withdrawn as desired through the pipes 15 and 17.

When one chlorine container has been exhausted it can be disconnected and another container supplied to take its place.

It will thus be seen that the present invention makes use in a particularly advantageous way of the latent heat of evaporization of liquid chlorine to counteract the heat of solution of the chlorine and the heat of reaction between the chlorine and the alkali of the solution, while the heat of the original solution together with the heat of reaction are made use of to supply the heat necessary to vaporize the liquid chlorine. The counteracting or neutralizing of the heat effects in this way is such that, for example, a hypochlorite solution can be made up with milk-of-lime and chlorine so as to contain as much as 100 grams or more of available chlorine per liter, and starting with the milk-of-lime at an initial temperature of about 20° C., the final temperature will not exceed about 30° C. It will be evident that solutions of decreased chlorine content can similarly be produced, either directly by chlorination of the alkaline solution or indirectly by dilution of the stronger bleach solution produced, for example, with a chlorine content such as that above described.

The invention is applicable not only to the production of bleach solutions by chlorinating milk-of-lime but also for the production of bleach solutions by chlorinating solutions of caustic soda or other alkaline solutions where heat of reaction is similarly produced by the chlorination and where the latent heat of evaporization of the chlorine can be similarly utilized in cooling the alkaline solution being reacted upon. The present invention greatly simplifies the utilization of liquid chlorine, as compared with the methods heretofore commonly employed, in that the heating of the liquid chlorine container itself (where a relatively small container is employed) is made unnecessary, and in that a special evaporator, in conjunction with large chlorine containers, with special heating means for heating and vaporizing the chlorine, is similarly made unnecessary. This heating of a considerable quantity of liquid chlorine (which the present invention obviates) is attended with some danger, for example, in case the chlorine gas outlet becomes accidently closed, or in case the temperature rises too high with the resulting production of excessive pressures:—e. g., at 100° C., the temperature of ordinary exhaust or wet steam, which is sometimes employed for heating liquid chlorine to evaporate it, the pressure of liquid chlorine is approximately 613 lbs. per square inch. The heating of such large bodies of chlorine, with attendant danger, is avoided by the present invention which introduces the liquid chlorine directly into, or into heat interchanging relation with, the alkaline solution. The cooling of the alkaline solution which is thus brought about, involves a further simplification of the operation, in that other cooling means, such as have heretofore been employed, are dispensed with.

It will thus be seen that the present invention presents advantages both in the handling of liquid chlorine and in the utilization of the chlorine for chlorinating the alkaline solution. The cooling of the solution, which is not only desirable but necessary for preparing strong bleach solutions, is combined in a particularly advantageous way with the heating of the liquid chlorine to bring about its vaporization, while the difficulties heretofore met with in handling liquid chlorine, and the expedients heretofore resorted to, are avoided.

I claim:

1. The method of preparing bleach solutions by subjecting alkaline solutions to the action of chlorine, which comprises supplying the chlorine in the form of liquid chlorine, and utilizing the heat of vaporization of the chlorine to cool the alkaline solution.

2. The method of preparing bleach solutions by subjecting alkaline solutions to the action of chlorine, which comprises supplying the chlorine in the form of liquid chlorine, and utilizing the heat of vaporization of the chlorine to cool the alkaline solution, the liquid chlorine being vaporized by indirect contact with the solution and being then introduced in gaseous form into the solution.

3. The method of preparing bleach solutions by subjecting alkaline solutions to the action of chlorine, which comprises supplying the chlorine in the form of liquid chlorine to cool the alkaline solution, the liquid chlorine being vaporized by indirect contact with the alkaline solution.

4. The method of preparing bleach solutions by subjecting alkaline solutions to the action of chlorine, which comprises cooling the alkaline solution undergoing chlorination by indirect contact with liquid chlorine undergoing vaporization.

5. The method of preparing bleach solutions by subjecting alkaline solutions to the action of chlorine, which comprises circulating the alkaline solution from and to a mixing tank by means of a pump, supplying the chlorine in the form of liquid chlorine and circulating it into indirect contact with the solution and thereby vaporizing the chlorine and cooling the solution, and discharging the vaporized chlorine into the circulating liquor, whereby the chlorine is intimately admixed with the solution by means of the pump.

6. The method of preparing bleach solutions by subjecting milk-of-lime to the action of chlorine, which comprises supplying the chlorine in the form of liquid chlorine and utilizing the heat of vaporization of the chlorine to cool the milk-of-lime solution undergoing chlorination.

7. The method of preparing bleach solutions by subjecting milk-of-lime to the action of chlorine, which comprises circulating the liquid chlorine in indirect contact with the milk-of-lime solution and thereby cooling the solution and vaporizing the liquid chlorine, and then introducing the vaporized chlorine into the milk-of-lime solution to chlorinate the same.

8. An apparatus for preparing bleach solutions comprising a mixing tank, a source of liquid chlorine, means for passing the liquid chlorine in indirect contact with the solution in the mixing tank to vaporize the liquid chlorine and cool the liquid in said tank, means for discharging the vaporized chlorine into such liquor, and means for bringing the chlorine so discharged into intimate contact and admixture with the liquor.

9. An apparatus for preparing bleach solutions by subjecting alkaline solutions to the action of chlorine comprising a mixing tank, circulating means for circulating liquor from said tank through a pump and back to the tank, and means for circulating liquid chlorine in indirect contact with the solution in said tank and then discharging the chlorine into said circulating means.

In testimony whereof I affix my signature.

JAMES H. MacMAHON.